United States Patent
Chen et al.

(10) Patent No.: US 8,098,242 B2
(45) Date of Patent: Jan. 17, 2012

(54) ARRANGEMENT COMPRISING A FIRST ELECTRONIC DEVICE AND A POWER SUPPLY UNIT AND METHOD FOR OPERATING AN ELECTRONIC DEVICE

(75) Inventors: Wen Shih Chen, Taipei (TW); Jukka Pensola, Taipei (TW)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 0 days.

(21) Appl. No.: 12/770,151

(22) Filed: Apr. 29, 2010

(65) Prior Publication Data

US 2011/0001744 A1    Jan. 6, 2011

Related U.S. Application Data

(63) Continuation of application No. PCT/EP2008/056431, filed on May 26, 2008.

(30) Foreign Application Priority Data

Nov. 2, 2007  (DE) .......................... 10 2007 052 881
Feb. 26, 2008  (WO) ................. PCT/EP2008/052322

(51) Int. Cl.
  *G09G 5/00*  (2006.01)
(52) U.S. Cl. ....................................... 345/212; 345/211
(58) Field of Classification Search .................. 345/211, 345/212; 323/282–290
See application file for complete search history.

(56) References Cited

U.S. PATENT DOCUMENTS

| 5,483,464 | A  | 1/1996  | Song |
| 5,515,257 | A  | 5/1996  | Ishii |
| 5,616,988 | A  | 4/1997  | Kim |
| 5,659,371 | A  | 8/1997  | Krause |
| 5,870,086 | A  | 2/1999  | Bang |
| 5,917,479 | A  | 6/1999  | Haapakoski |
| 5,944,830 | A  | 8/1999  | Hong et al. |
| 5,961,647 | A  | 10/1999 | Kim et al. |
| 6,052,291 | A  | 4/2000  | Suzuki et al. |
| 6,097,378 | A  | 8/2000  | Song |
| 6,107,698 | A  | 8/2000  | Ochiai et al. |
| 6,225,709 | B1 | 5/2001  | Nakajima |

(Continued)

FOREIGN PATENT DOCUMENTS

EP    0 678 843 A2    10/1995

(Continued)

OTHER PUBLICATIONS

Kuphaldt, T., "Lessons in Electric Circuits, vol.III—Semiconductors (NPN Transistor)," XP-002517561, Jul. 2007, pp. 172-181, 5$^{th}$ Edition, Design Science License.

(Continued)

*Primary Examiner* — Amare Mengistu
*Assistant Examiner* — Dmitriy Bolotin
(74) *Attorney, Agent, or Firm* — Slater & Matsil, L.L.P.

(57) ABSTRACT

An arrangement includes a first electronic device and a power supply unit adapted to provide the first electronic device with electric operating energy from a mains voltage. The first electronic device includes an evaluation unit adapted to switch the first electronic device from an operating state to at least one energy saving state and vice-versa, and a standard interface for connecting the first electronic device to a second electronic device.

14 Claims, 3 Drawing Sheets

U.S. PATENT DOCUMENTS

| | | |
|---|---|---|
| 6,259,172 B1 | 7/2001 | Lee |
| 6,275,221 B1 | 8/2001 | Song |
| 6,275,946 B1 | 8/2001 | Meir |
| 6,345,364 B1 | 2/2002 | Lee |
| 6,369,552 B2 | 4/2002 | Goyhenetche et al. |
| 6,404,423 B1 | 6/2002 | Kivelä et al. |
| 6,462,437 B1 | 10/2002 | Marmaropoulos et al. |
| 6,473,078 B1 | 10/2002 | Ikonen et al. |
| 6,480,400 B2 | 11/2002 | Wu et al. |
| 6,496,390 B2 | 12/2002 | Yang |
| 6,515,716 B1 | 2/2003 | Suzuki et al. |
| 6,769,070 B1 | 7/2004 | Kawata |
| 6,800,961 B2 | 10/2004 | Basso |
| 6,975,523 B2 | 12/2005 | Kim et al. |
| 7,000,127 B2 | 2/2006 | D'Alessio |
| 7,173,613 B2 | 2/2007 | Greenwood et al. |
| 7,222,250 B2 | 5/2007 | Matsubara |
| 7,273,285 B2 | 9/2007 | Yen et al. |
| 7,444,530 B2 | 10/2008 | Deppe et al. |
| 7,562,236 B2 | 7/2009 | Li et al. |
| 7,839,409 B2 | 11/2010 | Noorbakhsh et al. |
| 2002/0060676 A1 * | 5/2002 | Kim .......... 345/212 |
| 2003/0156106 A1 * | 8/2003 | Byun .......... 345/212 |
| 2003/0204761 A1 | 10/2003 | D'Alessio |
| 2004/0085308 A1 | 5/2004 | Oh et al. |
| 2006/0190632 A1 | 8/2006 | Yang et al. |
| 2007/0183807 A1 | 8/2007 | Park et al. |
| 2007/0257900 A1 | 11/2007 | Schulz |
| 2008/0106537 A1 | 5/2008 | Chiu |

FOREIGN PATENT DOCUMENTS

| | | |
|---|---|---|
| EP | 0 875 983 A2 | 10/1995 |
| EP | 1 199 697 A2 | 2/2002 |
| GB | 2 210 217 A | 6/1989 |
| WO | WO-99/44116 A2 | 9/1999 |

OTHER PUBLICATIONS

"VESA Display Power Management Signaling," XP-002488072, Online—Wikipedia Encyclopedia, downloaded from: http://en.wikipedia.org/wiki/VESA_Display_Power_Management_Signaling, Jul. 14, 2008, 1 page.

* cited by examiner

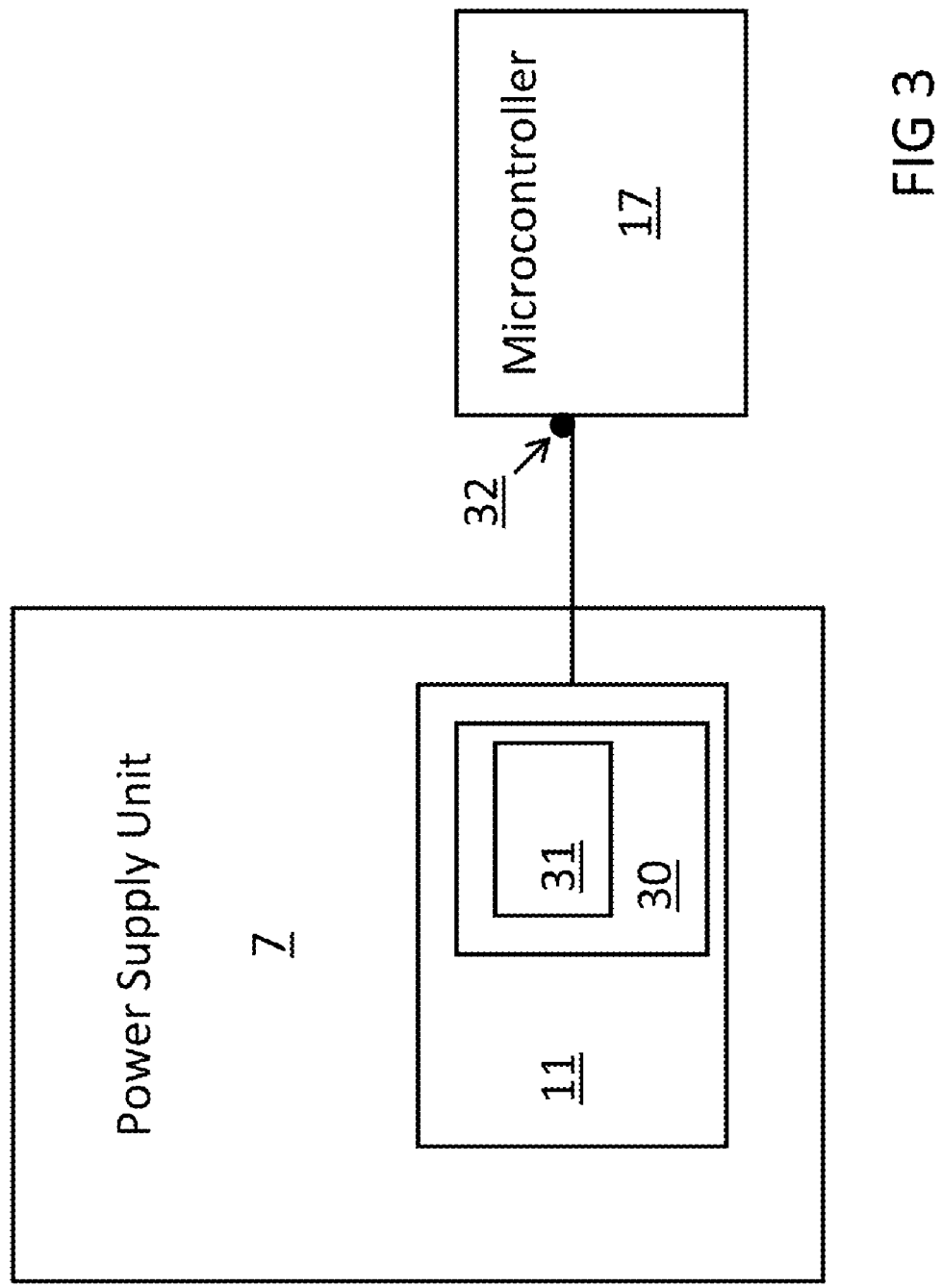

ARRANGEMENT COMPRISING A FIRST ELECTRONIC DEVICE AND A POWER SUPPLY UNIT AND METHOD FOR OPERATING AN ELECTRONIC DEVICE

This application is a continuation of co-pending International Application No. PCT/EP2008/056431, filed May 26, 2008, which designated the United States and was not published in English, and which claims priority to German Application No. 10 2007 052 881.9, filed Nov. 2, 2007, and to International Application No. PCT/EP2008/052322, filed Feb. 26, 2008, all of which applications are incorporated herein by reference.

TECHNICAL FIELD

The present application relates to an arrangement comprising a first electronic device and a power supply unit adapted to provide the first electronic device with electrical operating energy from a mains voltage. More particularly, the present application relates to electronic devices having at least one energy saving state.

BACKGROUND

Many electronic devices make use of an internal or external power supply unit for the provision of electrical operating energy from a mains voltage. For example, computer screens, such as LCD monitors, printers or scanners are usually connected to a mains voltage for operation. Often such electronic devices comprise at least one energy saving state, in which most of the functionality of the device is disabled. In such energy saving states, the electric power consumption of the electronic device is greatly reduced. For example, an LCD monitor having a typical power consumption of 40 W when in operation, may only consume power of 2 to 4 W in a so-called stand-by mode by deactivating a background illumination unit and/or a scaling unit.

However, even in stand-by or other energy saving states, the electronic device still needs to be supplied with at least some electrical energy. This is partly so because the electronic device needs to monitor input elements or connections in order to determine whether it is time to return to a full operating mode. For example, a printer may monitor a network port to observe if there is any new print job available. Because power supply units typically have a lower efficiency, if only a fraction of the nominal output power is consumed, the total loss of energy in stand-by mode may be substantial.

SUMMARY OF THE INVENTION

In one aspect, the present invention reduces the energy consumption of electronic devices in an energy saving state. It is a particular challenge to improve the energy consumption of electronic devices in an energy saving state to zero or close to zero Watts.

According to a first embodiment of the invention, an arrangement includes a first electronic device and a power supply unit adapted to provide the first electronic device with electric operating energy from a mains voltage. Therein, the first electronic device includes an evaluation unit coupled to the power supply unit and adapted to switch the first electronic device from an operating state into at least one energy saving state, and vice-versa. It is further adapted to turn off the power supply, if the first electronic device is switched into the energy saving state, and to turn on the power supply if the first electronic device is switched into the operating state. The first electronic device further includes a standard interface for connecting the first electronic device to a second electronic device, the standard interface being adapted to supply the evaluation unit with electric auxiliary energy received from the second electronic device.

By enabling an evaluation unit to switch off a power supply unit in at least one energy saving state, the power consumption of the power supply unit can be reduced to zero. Furthermore, in order to enable continued operation of the evaluation unit, an auxiliary electric energy is provided from a second electronic device by means of a standard interface.

According to an advantageous embodiment, the standard interface includes an auxiliary voltage line, and the evaluation unit is connected to the auxiliary voltage line. Such auxiliary voltage lines are available in many standard interfaces, such as graphics interfaces or peripheral interfaces and enable to provide the evaluation unit with the auxiliary energy in an easy and power-efficient way.

According to a further embodiment, the evaluation unit is coupled with a timer for determining an idle period of the first or second electronic device. In a further embodiment, the timer is arranged in the second electronic device and the coupling with the evaluation unit is implemented via the standard interface. By providing a timer, either in the first or second electronic device, coupled with the evaluation unit, an energy saving state may be activated by the evaluation unit after a predetermined period of time.

According to a further advantageous embodiment, the standard interface is a graphics interface, for example a VGA, a DVI, HDMI, a display port or a SCART/AV interface, adapted to connect the first electronic device with the second electronic device, the second electronic device being a computer or a receiver.

In an arrangement including an image source such as a computer, a receiver or another electronic device connected by means of a graphics interface, the image source usually controls and provides signals for the activation and deactivation of energy saving states of the first electronic device. In this case, auxiliary energy from the image source may be used to supply the first electronic device with the required electric auxiliary energy.

According to a further advantageous embodiment, the first electronic device is a display device, including a display screen and a scaling unit, wherein the scaling unit is coupled to the graphics interface and the display screen, the scaling unit being adapted to generate an output signal for the display screen based on a graphics signal received from the graphics interface. According to a further embodiment, the evaluation unit is integrated into the scaling unit. By integrating the evaluation unit into a display device in general, or into a scaling unit in particular, the evaluation unit can be included in the electronic device included in an ordinary display device.

According to a further embodiment, the scaling unit includes a microcontroller connected to the graphics interface for supplying the microcontroller with an operating energy in the power saving state, wherein the microcontroller is adapted to perform the function of the evaluation unit. According to a further embodiment, the microcontroller is further adapted to generate at least one control signal for the scaling unit in the operating mode.

By providing a microcontroller in the scaling unit, the evaluation unit can be easily implemented. In particular, if a microcontroller used to generate control signals in the operating mode is also used to control the power supply in the energy saving mode, no further components are needed to implement the evaluation device.

According to a further advantageous embodiment, the power supply includes a switching element for controlling the power supply unit connected to the first electronic device, and the evaluation unit is adapted to open the switching element in the energy saving state. By opening the switching element in the energy saving state, the power supply unit can be deactivated.

According to a further advantageous embodiment, the switching element is arranged in a primary supply line arranged between a mains voltage and a power supply unit, and the power supply unit is turned off by opening the switching element. According to a further embodiment, the switching element includes a relay for electrically disconnecting the mains voltage from the power supply unit. By using a switching element arranged in a primary supply line, for example, a relay, the power supply unit can be electrically disconnected from the mains voltage.

According to a further embodiment, a bypass switch is arranged in parallel to the switching element, adapted to connect the power supply unit with the mains voltage. By using a bypass switch, the power supply unit may be reactivated manually.

According to a further advantageous embodiment, the power supply unit includes a switching power converter and the switching element includes at least one semiconductor switch for controlling the duty cycle of the switching power converter using a pulse width modulated control signal, and the power supply unit is turned off by deactivating the pulse width modulated control signal. By deactivating a pulse width modulated control signal, a switching power converter can be switched off without the need for any further components in the power supply unit.

According to a further embodiment, the pulse width modulated control signal is provided by a microcontroller of the evaluation unit. By integrating the generation of the pulse width modulated control signal with the other functionality of the evaluation unit, the number of components required to implement the arrangement with the energy saving state can be further reduced. In fact, in an electronic device already including a microcontroller controlled switching power supply, no further electrical components may be required.

According to second aspect, a method for operating a first electronic device having a power saving state and an operating state is provided. In this method, electric auxiliary energy is received from a second electronic device by means of a standard interface connecting the first and the second electronic device. An evaluation unit of the first electronic device is operated with the received electric auxiliary energy. An activation signal is detected using the evaluation unit. The first electronic device is switched in the operating state by activating a power supply unit coupled to the evaluation unit for providing the first electronic device with electric operating energy.

The method steps detailed above enable the activation of the first electronic device from an energy saving state without the need for a power supply unit of the first electronic device being powered all the time.

Further advantageous embodiments are described in the claims attached hereto and in the following detailed description.

BRIEF DESCRIPTION OF THE DRAWINGS

An embodiment of the present invention is described with reference to the following figures.

FIG. 3 shows a schematic illustration of a portion of the arrangement of FIG. 1.

DETAILED DESCRIPTION OF ILLUSTRATIVE EMBODIMENTS

Figure 1:
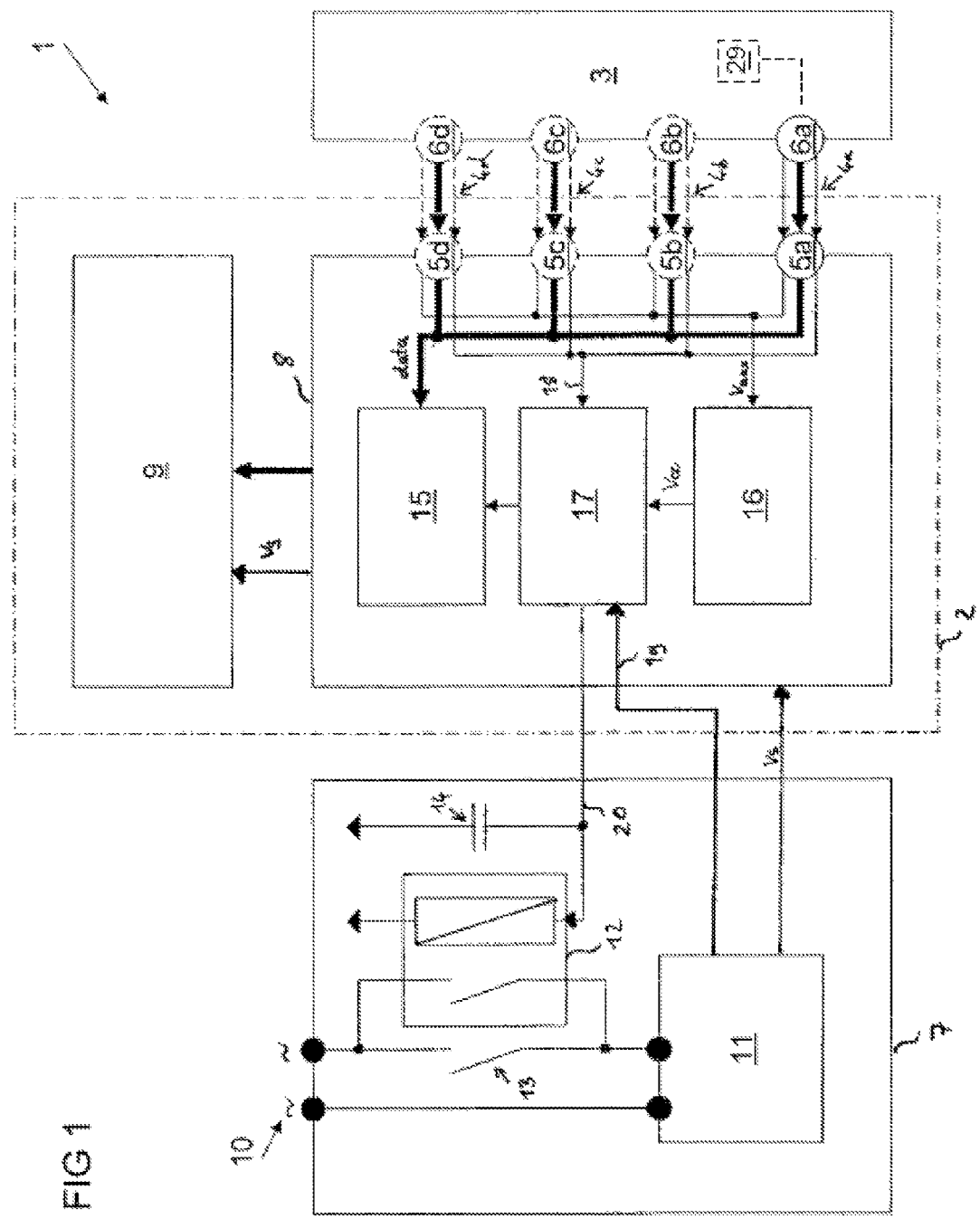
FIG. 1 shows a schematic illustration of an arrangement including a first and a second electronic device.

FIG. 1 shows an arrangement 1 including a first electronic device 2. The first electronic device 2 is coupled with a second electronic device 3. The second electronic device 3 may be, for example, a computer or similar electronic device. The first electronic device 2 may be a peripheral electronic device, for example, a computer monitor or a printer.

The first electronic device 2 and the second electronic device 3 are coupled by one or more standard interfaces 4. In the embodiment shown in FIG. 1, four standard interfaces 4a to 4d are available for connecting the first electronic device 2 with the second electronic device 3. For example, the first standard interface 4a may be a display port interface, the second standard interface 4b may be a VGA interface, the third standard interface 4c may be a DVI interface, and the fourth standard interface 4d may be an HDMI interface.

FIG. 1 further shows that the first electronic device includes four first connectors 5a to 5d and that the second electronic device 3 comprises four second connectors 6a to 6d corresponding to the standard interfaces 4a to 4d, respectively. However, in practice, the first electronic device 2 and the second electronic device 3 may have different numbers and types of standard interfaces 4 and first and second connectors 5 and 6, respectively. For the arrangement 1 to operate in accordance with the invention, it suffices if one compatible standard interface 4 is shared by the first and second electronic devices 2 and 3.

The first electronic device 2 is connected with a power supply unit 7, which may be internal or external to the first electronic device 2. The power supply unit 7 couples the first electronic device 2 with a mains voltage 10. For this purpose, the power supply unit 7 includes an AC/DC power module 11, a latching relay 12, a switch 13, and a capacitor 14.

The relay 12 or the switch 13 may be used to connect the AC/DC power module with one or two contacts of the mains voltage 10. If both the switch 13 and the relay 12 are opened, the AC/DC power module 11 is physically disconnected from the mains voltage 10 and hence will consume no electrical energy. By opening the switch 13, the first electronic device can be put into an energy saving mode as described below. By closing it, it operates like a conventional device.

The first electronic device 2 includes a scaling board 8 and an LCD panel 9. The scaling board 8 includes a scaling chip 15, a DC/DC converter 16 and a microcontroller 17. The scaling chip 15 is adapted to scale analog or digital data received from one of the standard interfaces 4a to 4d in order to generate appropriate driving signals for the LCD panel 9. For example, the integrated circuit MST 6251DA-LF-165 by MStar may be used. The DC/DC converter 16 is adapted to convert an auxiliary voltage VAUX provided from one of the standard interfaces 4a to 4d to an operational voltage Vcc provided to the microcontroller 17.

The microcontroller 17 is adapted to monitor interrupt lines 18 and 19 connected to the standard interfaces 4 and the AC/DC power module 11, respectively. The first interrupt line 18 is connected, for example, to a vertical and/or horizontal synchronization signal, which is part of one or several of the standard interfaces 4a to 4d. If the microcontroller 17 observes an interrupt on the first interrupt line 18, for example, a falling or rising flank because a horizontal and/or vertical synchronization signal is provided via the VGA interface 4b, it may close the relay 12 of the power supply unit 7 by means of a control line 20. The second interrupt line 19 indicates whether the AC/DC power module 11 is provided with an AC input voltage, i.e., the mains voltage 10. That is, the second interrupt line 19 indicated whether the relay 12 or the switch 13 are closed. If the second interrupt line 19 indicates an AC power, the first electronic device is switched into an operating state by the microcontroller 17. Otherwise, it is switched into a energy saving state, in which the microcontroller is either supplied by the second electronic device 3 with auxiliary energy only or completely switched off.

If, for example, the switch 13 is closed, the microcontroller 17 may also close the relay 12 to permanently activate the power supply unit 7 independently from the second electronic device 3. In this way, the microcontroller 17 may activate the power supply unit 7, which was previously disconnected from the mains voltage 10 in order to power up the first electronic device 2 in general and the scaling board 8 in particular. Conversely, if the microcontroller 17 detects by means of the first interrupt line 18 or by means of an idle timer, that the first electronic device 2 should be deactivated, it may open the relay 12 by means of the control line 20 and consequently isolate the AC/DC power module 11 from the mains voltage 10. In one example, a timer 29 can be located in the second electronic device 3 and coupled with the evaluation unit 17 via the standard interface 4. In order to operate the microcontroller 17 independently from the power supply unit 7, a low energy microcontroller 17 should be used, for example, a Myson CS8955 microcontroller.

The microcontroller 17 may be used to control and provide the energy for the operation of the relay 12 directly, i.e., without a further amplification circuit. In such an arrangement, the capacitor 14 may be used to supply the energy needed for the state change of the latching relay 12. Typical microcontroller electrical current driving capability, i.e., their power output, is limited and may not be sufficient for the relay operation, i.e., a latching relay state change. For example, the relay coil latching power draw is typically 150 mW to 200 mW. The maximum output power of a general purpose output pin of a microcontroller is typically less than the needed power for the relay latching. For example, its power output is less than 40 mW typically. In order to overcome this discrepancy, the serial capacitor 14 arranged parallel to latching relay 12 may be charged by the microcontroller 17. Then, the serial capacitor finally provides the previously stored power necessary for the relay latching operation.

It should be noted that, for display devices in particular, well-established energy saving modes exist. In particular, in the VESA DPMS sleep mode, an electrical auxiliary energy is provided by a graphics component of a computer. In this mode, the power supply unit 7 of the first electronic device 2, e.g., an LCD monitor, may be deactivated, limiting the power consumption of the first electronic device to the electrical auxiliary energy, e.g., to below 250 mW. In VESA DPMS off mode, i.e., if the computer is switched into standby or completely turned off, the electrical auxiliary energy is also turned off, thus reducing the energy consumption of the first electrical device to zero. Nevertheless, the first electronic device 2 may be woken up and turned into the operating state without any user interaction as described below.

Figure 2:
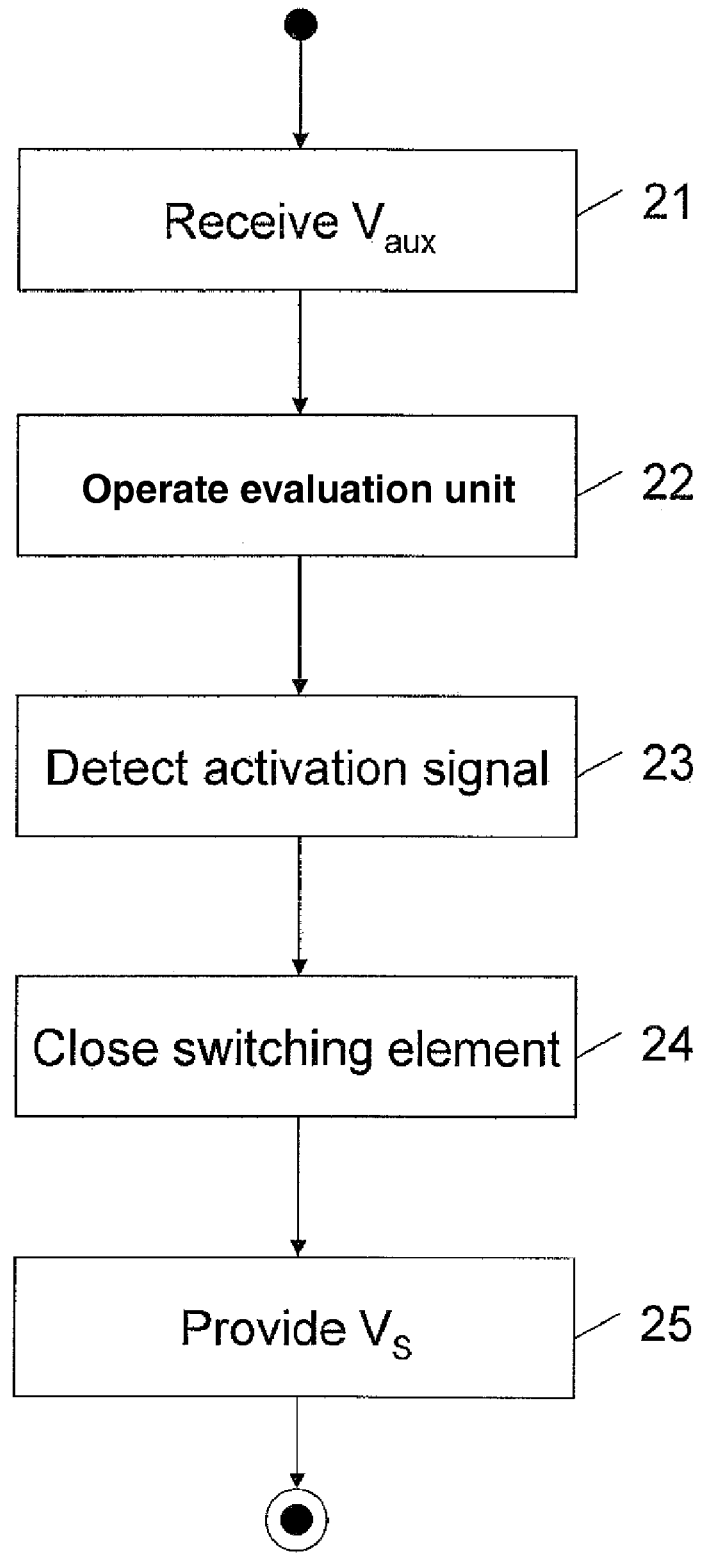
FIG. 2 shows a flow chart of a method for operating the first electronic device.

FIG. 2 shows a flow chart of a method for operating the first electronic device 2 according to an embodiment of the invention. In a first step 21, an auxiliary voltage $V_{AUX}$ is received via a standard interface 4 connecting the first electronic device 2 to a second electronic device 3. For example, the display port connector 5a receives a voltage of 3.3 V with a maximum load of 500 mA on pin 20. The VGA connector 5b receives an auxiliary voltage of 5 V with a maximum load of 50 mA on pin 8. The DVI connector 5c receives an auxiliary voltage of 5 V and a maximum load of 50 mA on pin 14. The HDMA connector 5d receives an auxiliary voltage of 5 V and a maximum load of 50 mA on pin 18. In this way, an auxiliary energy of at least 250 mW can be obtained by means of any one of the standard interfaces 4a to 4d.

Other types of standard interfaces may also provide auxiliary voltages. For example, a USB port is often used to connect other peripheral devices to a computer system and provides a voltage of 5 V on pin 1. Other standard interfaces such as serial or parallel ports or IEEE 1394 interfaces also provide voltages of 3.3 or 5 V. In addition, electrical energy included in other types of signals, such as a clock signal, may be converted into an auxiliary electrical energy, for example, by rectifying an alternating current component or smoothing a modulated signal into a direct current.

In a second step 22, an evaluation unit of the first electronic device 2 is operated. In an exemplary embodiment shown in FIG. 1, the microcontroller chip 17 acts as an evaluation unit and is operated using the auxiliary energy received from one of the standard interfaces 4. In order to match the auxiliary voltage $V_{AUX}$ received from any one of the first connectors 5a to 5d to the power requirements of the microcontroller 17, the DC/DC converter 16 is used. For example, a down converter converting the various auxiliary voltages provided by the first connectors 5a to 5d down to a common voltage of 3 V may be used.

In a power saving mode, that is when the power supply unit 7 is deactivated, only very few functional elements of the first electronic device 2 in general and the scaling board 8 in particular are provided with the auxiliary power generated by the DC/DC converter 16. In particular, the scaling chip 15 is completely deactivated. The microcontroller 17 may be operated at a lower voltage or lower operating frequency than in a fully switch-on mode. In addition, further components of the scaling board 8 not shown in FIG. 1, such as analog-to-digital converters of low-voltage differential signaling circuits may be deactivated.

In a further step 23, the evaluation unit detects an activation signal. For example, the microcontroller 17 might detect that a synchronization signal is provided via one of the standard interfaces 4a to 4d by means of the first interrupt line 18. Alternatively, another activation signal may be received from the power supply unit 7 itself or from a timer circuit integrated into the microcontroller 17. In a further embodiment, the microcontroller 17 activates the power supply unit 7 and the scaling board 8 at predetermined time intervals in order to actively supervise one of the standard interfaces 4a to 4d, if no wake-up signal in form of a synchronization signal is provided by the second electronic device 3 via the standard interfaces 4a to 4d.

In a further step 24, the power supply unit 7 is switched on. For example, the AC/DC power module 11 may be connected to the mains voltage 10. According to the embodiment shown in FIG. 1, the relay 12 is closed. Preferably, the relay 12 is implemented as a latching optoelectrical relay, a solid state relay, or an electromechanical latching type relay. Latching relays have the advantage that they do not require energy in order to remain in a particular switching state. Use of an optoelectrical relay or solid state relay has the advantage that the wear of the relay is greatly reduced with respect to electromechanical relay. Consequently, the operation of the relay 12 can be guaranteed over a longer period of time. As detailed above, in a first phase, a capacitor 14 may be charged before, in a second phase, the relay 12 is switched using the previously stored energy.

In a further step 25, the power supply unit provides an operating voltage Vs to the electronic device 2. In particular, the AC/DC power module 11 generates a supply voltage Vs to operate the scaling board 8. The evaluation unit, for example, the microcontroller 17, also receives a feedback signal from the AC/DC power module 11 to confirm that the power supply unit 7 is now switched on and the first electronic device 2 is in an operational mode. In this mode, the microcontroller 17 may continue to monitor the standard interfaces 4a to 4d in order to detect the switch-off signal received from the second electronic device 3. In this case, the evaluation unit may deactivate the power supply unit 7 by means of the control line 20 and the relay 12. This step is not, however, shown in FIG. 2.

In a preferred embodiment as shown in FIG. 3, the microcontroller 17 controls the operation of the AC/DC power module 11. In particular, the AC/DC power module 11 may include a switching power converter 30 and the microcontroller 17 may provide a pulse width modulated control signal via a general purpose I/O (GPIO) pin 32 in order to regulate the switching power converter 30. In order to enable a closed loop control of the switching power supply, a feedback pin from the power supply unit 7 may be used to control the operation of the AC/DC power module 11.

As an example, the power supply unit 7 comprises a switching power converter 30. The switching power converter 30 comprises at least one semiconductor switch 31 for controlling a duty cycle of the switching power converter 30 using the pulse width modulated control signal. An evaluation unit, such as microcontroller chip 17, is coupled to the power supply unit 7 and is adapted to switch the first electronic device 2 from an operating state into at least one energy saving state and vice-versa, to turn off the power supply if the first electronic device 2 is switched into the energy saving state, and to turn on the power supply if the first electronic device 2 is switched into the operating state. The evaluation unit 17 provides the pulse width modulated control signal to regulate the switching power converter 30 of the power supply unit 7 and, in the energy saving state, the power supply unit 7 is turned off by deactivating the pulse width modulated control signal.

In the energy saving mode, if the power supply unit 7 is to be deactivated, the microcontroller 17 may completely deactivate the pulse width modulated control signal and consequently deactivate the power supply unit 7. In this case, no additional relay 12 may be required in the power supply unit 7. Of course, also a combination of both techniques may be applied. For example, a relay 12 arranged between the AC mains voltage 10 and an input of the AC/DC power module 11 and a switching element arranged at or close to the output of the AC/DC power module 11 may be deactivated by the microcontroller 17.

Furthermore, the power supply unit 7 may be internal or external to the first electronic device 2. Finally, functional elements shown as separate components in FIG. 1 may be integrated into one semiconductor circuit or separated into several semiconductor circuits. For example, the functionality of the scaling chip 15 and the microcontroller 17 may be integrated into one common chip, as long as the functional area responsible for the scaling of the received data signal can be deactivated.

Finally, the circuit and method described above are not restricted to an arrangement including a computer and a connected monitor or other peripheral devices. Equally, they may be used with any arrangement including a first electronic device acting as a slave and a second electronic device acting as a master.

What is claimed is:

1. An arrangement comprising:
   a power supply unit comprising a switching power converter, the switching power converter comprising at least one semiconductor switch for controlling a duty cycle of the switching power converter using a pulse width modulated control signal; and
   a first electronic device coupled to the power supply unit such that the power supply unit provides the first electronic device with electric operating energy from a mains voltage, wherein the first electronic device comprises:
   an evaluation unit coupled to the power supply unit and adapted to switch the first electronic device from an operating state into at least one energy saving state and vice-versa, to turn off the power supply if the first electronic device is switched into the energy saving state, and to turn on the power supply if the first electronic device is switched into the operating state, wherein the evaluation unit comprises a microcontroller having a general purpose I/O pin providing the pulse width modulated control signal via the general purpose I/O pin to the at least one semiconductor switch to regulate the switching power converter of the power supply unit and, in the energy saving state, the microcontroller turns off the power supply unit by deactivating the pulse width modulated control signal; and
   a standard interface for connecting the first electronic device to a second electronic device, the standard interface being adapted to supply the evaluation unit with an electric auxiliary energy received from the second electronic device, wherein the standard interface comprises a graphics interface adapted to connect the first electronic device with the second electronic device;
   wherein the first electronic device comprises a display device, comprising a display screen and a scaling unit, wherein the scaling unit is coupled to the graphics interface and the display screen, the scaling unit being adapted to generate an output signal for the display screen based on a graphics signal received from the graphics interface;
   wherein the evaluation unit is integrated into the scaling unit;
   wherein the scaling unit comprises the microcontroller of the evaluation unit, the microcontroller being connected to the graphics interface for supplying the microcontroller with an operating energy in the energy saving state; and
   wherein, in the energy saving state, the scaling unit is completely deactivated while the microcontroller is supplied with auxiliary energy received from the second electronic device.

2. The arrangement according to claim 1, wherein the standard interface includes an auxiliary voltage line, and the evaluation unit is connected to the auxiliary voltage line.

3. The arrangement according to claim 1, wherein the evaluation unit is coupled with a timer for determining an idle period of the first electronic device or the second electronic device.

4. The arrangement according to claim 3, wherein the timer is located in the second electronic device and the coupling with the evaluation unit is implemented via the standard interface.

5. The arrangement according to claim 1, wherein the standard interface comprises a VGA, DVI, HDMI, display port or a SCART/AV interface.

6. The arrangement according to claim 5, wherein the second electronic device comprises a computer or a receiver.

7. The arrangement according to claim 1, wherein the microcontroller is further adapted to generate at least one control signal for the scaling unit in the operating state.

8. The arrangement according to claim 1, wherein the power supply unit is integrated into the first electronic device.

9. A method for operating a first electronic device that has a power saving state and an operating state and is coupled to a power supply unit that comprises a switching power converter, the switching power converter comprising at least one semiconductor switch for controlling a duty cycle of the switching power converter using a pulse width modulated control signal, the power supply unit being adapted to provide the first electronic device with electric operating energy from a mains voltage, the method comprising:
  receiving electric auxiliary energy from a second electronic device by way of a standard interface that connects the first electronic device and the second electronic device;
  operating an evaluation unit of the first electronic device with the received electric auxiliary energy;
  detecting an activation signal using the evaluation unit;
  switching the first electronic device into the operating state by activating the power supply unit coupled to the evaluation unit thereby providing the first electronic device with the electric operating energy from the mains voltage;
  detecting a deactivation signal using the evaluation unit; and
  switching the first electronic device into the power saving state by deactivating the power supply unit,
  wherein the evaluation unit comprises a microcontroller having a general purpose I/O pin that provides the pulse width modulated control signal via the general purpose I/O pin to the at least one semiconductor switch to regulate the switching power converter of the power supply unit and, in the energy saving state, wherein the microcontroller turns off the power supply unit by deactivating the pulse width modulated control signal, such that a scaling chip of a scaling unit coupled to the standard interface is completely deactivated, while the microcontroller is supplied with the auxiliary energy received from the second electronic device.

10. The method according to claim 9, wherein at least one of the activation or deactivation signals is provided by the second electronic device via the standard interface.

11. The method according to claim 10, wherein receiving the electric auxiliary energy over the standard interface comprises receiving the activation signal.

12. The method according to claim 10, wherein the activation signal comprises a synchronization signal received over the standard interface.

13. A display device, comprising:
  an integrated power supply unit for providing the display device with electric operating energy from a mains voltage, the integrated power supply unit comprising a switching power converter, the switching power converter comprising at least one semiconductor switch for controlling a duty cycle of the switching power converter using a pulse width modulated control signal;
  an evaluation unit coupled to the power supply unit and adapted to switch the display device from an operating state into at least one energy saving state and vice-versa, to turn off the integrated power supply if the display device is switched into the energy saving state, and to turn on the power supply if the display device is switched into the operating state:
  a display screen;
  a graphics interface for connecting the display device to an other electronic device, the graphics interface being adapted to supply the evaluation unit with an electric auxiliary energy received from the other electronic device; and
  a scaling unit comprising a microcontroller, wherein the scaling unit is coupled to the graphics interface and the display screen, the scaling unit being adapted to generate an output signal for the display screen based on a graphics signal received from the graphics interface, wherein the microcontroller is connected to the graphics interface for supplying the microcontroller with an operating energy in the energy saving state;
  wherein the evaluation unit is integrated into the scaling unit and wherein the microcontroller of the scaling unit provides the pulse width modulated control signal to regulate the switching power converter of the integrated power supply and, in the energy saving state, the integrated power supply unit is turned off by deactivating the pulse width modulated control signal; and
  wherein the scaling unit further comprises a scaling chip and, in the energy saving mode the scaling chip is completely deactivated while the microcontroller is supplied with auxiliary energy received from the other electronic device.

14. The display device according to claim 13, wherein, in the energy saving mode the microcontroller of the scaling unit is operated at a lower voltage or lower operating frequency than in a fully switched-on mode.

* * * * *